United States Patent
Mun et al.

(10) Patent No.: US 11,384,235 B2
(45) Date of Patent: Jul. 12, 2022

(54) RETARDATION FILM, POLARIZING PLATE COMPRISING SAME, AND LIQUID CRYSTAL DISPLAY DEVICE COMPRISING SAME

(71) Applicant: LG CHEM, LTD., Seoul (KR)

(72) Inventors: Byoung Jun Mun, Daejeon (KR); Nam Jeong Lee, Daejeon (KR); Joonghoon Lee, Daejeon (KR); Sungho Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 80 days.

(21) Appl. No.: 17/045,964

(22) PCT Filed: Apr. 18, 2019

(86) PCT No.: PCT/KR2019/004707
§ 371 (c)(1),
(2) Date: Oct. 7, 2020

(87) PCT Pub. No.: WO2019/203596
PCT Pub. Date: Oct. 24, 2019

(65) Prior Publication Data
US 2021/0122909 A1    Apr. 29, 2021

(30) Foreign Application Priority Data
Apr. 18, 2018 (KR) .......................... 10-2018-0044904

(51) Int. Cl.
*G02F 1/1335*      (2006.01)
*C08L 33/08*       (2006.01)
(Continued)

(52) U.S. Cl.
CPC .............. *C08L 33/08* (2013.01); *C08J 5/18* (2013.01); *C08K 5/3492* (2013.01);
(Continued)

(58) Field of Classification Search
CPC ................................................. G02F 1/133638
See application file for complete search history.

(56) References Cited

U.S. PATENT DOCUMENTS 7,985,803 B2     7/2011  Yonezawa et al.
9,581,728 B2 *   2/2017  Kaneko .................. C08K 5/357
(Continued)

FOREIGN PATENT DOCUMENTS

CN    104395792 A  *  3/2015 ....... B29D 11/00644
EP      3284784 A1      2/2018
(Continued)

*Primary Examiner* — Edmond C Lau
(74) *Attorney, Agent, or Firm* — Dentons US LLP (57) ABSTRACT

The present application relates to a retardation film including a composition or a cured product thereof, the composition comprising: an acrylate-based resin having a glass transition temperature (Tg) of 120° C.; or more; a retardation adjusting agent comprising a styrene monomer; and a triazine-based birefringence adjusting agent, in which the triazine-based birefringence adjusting agent is included in an amount of more than 5 parts by weight and 15 parts by weight or less, based on 100 parts by weight of the acrylate-based resin; a polarizing plate comprising the same, and a liquid crystal display device comprising the same.

14 Claims, 1 Drawing Sheet

(51) Int. Cl.
  *C08J 5/18*      (2006.01)
  *C08K 5/3492*    (2006.01)
  *G02B 5/30*      (2006.01)
  *G02F 1/00*      (2006.01)
  *G02F 1/13363*   (2006.01)
  *C08F 12/08*     (2006.01)

(52) U.S. Cl.
  CPC ......... *G02B 5/3083* (2013.01); *G02F 1/0063* (2013.01); *G02F 1/13363* (2013.01); *G02F 1/133528* (2013.01); *C08F 12/08* (2013.01); *C08J 2333/08* (2013.01); *G02F 2413/105* (2013.01); *G02F 2413/13* (2013.01); *G02F 2413/14* (2013.01)

(56) References Cited

U.S. PATENT DOCUMENTS

| | | |
|---|---|---|
| 2010/0182689 A1 | 7/2010 | Nakanishi et al. |
| 2014/0071530 A1 | 3/2014 | Part et al. |

FOREIGN PATENT DOCUMENTS

| | | |
|---|---|---|
| JP | 2008-50550 A | 3/2008 |
| JP | 2008-146003 A | 6/2008 |
| JP | 2008-262182 A | 10/2008 |
| JP | 2010139871 A | 6/2010 |
| JP | 2010286584 A | 12/2010 |
| JP | 2011209627 A | 10/2011 |
| JP | 2014-186273 A | 10/2014 |
| JP | 2016094550 A | 5/2016 |
| KR | 10-2005-0101743 A | 10/2005 |
| KR | 10-2009-0081148 A | 7/2009 |
| KR | 10-2011-0106469 A | 9/2011 |
| KR | 10-2013-0074987 A | 7/2013 |
| KR | 10-2015-0010461 A | 1/2015 |
| KR | 10-2015-0145610 A | 12/2015 |
| WO | 2016167292 A1 | 10/2016 |

* cited by examiner

RETARDATION FILM, POLARIZING PLATE COMPRISING SAME, AND LIQUID CRYSTAL DISPLAY DEVICE COMPRISING SAME

The present application is a National Phase entry of International Application No. PCT/KR2019/004707 filed on Apr. 18, 2019, and claims priority to and the benefit of Korean Patent Application No. 10-2018-0044904 filed in the Korean Intellectual Property Office on Apr. 18, 2018, the entire contents of which are incorporated herein by reference.

FIELD

The present invention relates to a retardation film, a polarizing plate comprising the same, and a liquid crystal display device comprising the same.

BACKGROUND

Recently, with the development of optical technology, display devices using various systems such as a plasma display panel (PDP), a liquid crystal display (LCD), and an organic light emitting diode (OLED) replacing a cathode-ray tube in the related art have been proposed and come into the market. Recently, characteristics required for these display devices tend to become highly advanced, and accordingly, characteristics required for peripheral parts, such as an optical film, applied to a display device also tend to be highly advanced. In particular, as the recent display devices have become thinner and lighter and the screen areas thereof have been enlarged, wider viewing angle, higher contrast, suppression of a change in image tone according to a viewing angle, and uniformity of screen display have become particularly important issues.

A retardation film is an optical film used in a display device for the purpose of improving viewing angle, display quality, and the like, and may be divided into retardation films having a forward wavelength dispersion property, a flat wavelength dispersion property, and a reverse wavelength dispersion property, in accordance with wavelength dispersion characteristics. A retardation film having the forward wavelength dispersion property means a retardation film having a characteristic in which the retardation value generated decreases as the wavelength of the incident light increases. A retardation film having a flat wavelength dispersion property means a retardation film having a characteristic in which a similar retardation value is generated regardless of the wavelength of the incident light. A e retardation film having the reverse wavelength dispersion property means a retardation film having a characteristic in which the retardation value generated also increases as the wavelength of the incident light increases.

Most retardation films developed so far have the forward wavelength dispersion property or the flat wavelength dispersion property. In the case of a retardation film having the forward wavelength dispersion property or the flat wavelength dispersion property, the degree of phase delay varies when the optical wavelength is changed, so that there is a problem in that it is difficult to obtain uniform color or visual sensation. In contrast, when a retardation film has a reverse wavelength dispersion property, the phase delay value also increases as the optical wavelength increases, so that the retardation film having the reverse wavelength dispersion property has drawn attention in that it is possible to implement a relatively uniform phase delay in a relatively wide band of optical wavelengths.

However, since the wavelength dispersion property is a characteristic exhibited inherently depending on a material for a retardation film, a new raw material needs to be found in order to manufacture a retardation film having the reverse wavelength dispersion property with one film, which is not actually easy. Accordingly, in the related art, a method of manufacturing a retardation film having the reverse wavelength dispersion property by laminating two or more retardation films having different wavelength dispersion properties using an adhesive agent or a bonding agent, a method of co-extruding a resin having a positive retardation value and a resin having a negative retardation value to form a laminate, and stretching the laminate, or the like, has been proposed.

However, the first method has a problem in that, when the optical axes of two retardation films to be laminated are not disposed exactly, the reverse wavelength dispersion property is exhibited, so that it is very difficult to manufacture the retardation film having the reverse wavelength dispersion property. The second method has a problem in that, when the glass transition temperatures of the resins forming the respective layers are not similar, the resins are not properly stretched, so that an available resin is limited.

In addition, a retardation film in which the wavelength dispersion property is improved into reverse wavelength dispersion or flat wavelength dispersion has a problem in that the glass transition temperature is significantly lowered, so that the heat resistance is weak.

Therefore, there is a need for developing a retardation film capable of implementing the reverse wavelength/flat wavelength dispersion property, which is easily manufactured and excellent in heat resistance.

Korean Patent Application Laid-Open No. 2005-0101743

SUMMARY

The present invention has been made in an effort to provide a retardation film, a polarizing plate comprising the same, and a liquid crystal display device comprising the same.

An exemplary embodiment of the present application provides a retardation film comprising a composition or a cured product thereof, the composition comprising: an acrylate-based resin having a glass transition temperature (Tg) of 120° C.; or more; a retardation adjusting agent comprising a styrene monomer; and a triazine-based birefringence adjusting agent, in which the triazine-based birefringence adjusting agent is included in an amount of more than 5 parts by weight and 15 parts by weight or less, based on 100 parts by weight of the acrylate-based resin.

Another exemplary embodiment of the present application provides a polarizing plate comprising: a polarizer; and the one or more retardation films according to an exemplary embodiment of the present application.

Still another exemplary embodiment of the present application provides a liquid crystal display device comprising: a liquid crystal cell; an upper polarizing plate provided on an upper part of the liquid crystal cell; a lower polarizing plate provided on a lower part of the liquid crystal cell; and a backlight unit provided on a lower part of the lower polarizing plate, in which at least one of the upper polarizing plate and the lower polarizing plate comprises: a polarizer; and the retardation film according to an exemplary embodiment of the present application, disposed on one surface of the polarizer.

The retardation film according to the present invention comprises: an acrylate-based resin having a glass transition temperature (Tg) of 120° C.; or more; a retardation adjusting agent comprising a styrene monomer; and a specific content of triazine-based birefringence adjusting agent, thereby providing a retardation film which is excellent in heat resistance.

Further, the retardation film according to the present invention may implement the reverse wavelength/flat wavelength dispersion property by using the specific content of triazine-based birefringence adjusting agent to change the wavelength dispersion property using a difference in refractive index from the acrylate-based resin, and the retardation film of the present invention has the reverse wavelength dispersion property in which as the optical wavelength increases, the phase delay value increases, thereby generating a relatively uniform degree of phase delay in a wide band of optical wavelengths. As a result, when the retardation film of the present invention is applied to a polarizing plate or a display device, the retardation film can implement excellent color, visual sensation, and optical characteristics as compared to the related art.

EXPLANATION OF REFERENCE NUMERALS AND SYMBOLS

101: Retardation film
102: Polarizer
103: Polarizing plate
104: Polarizer protection film (retardation film)
105: Bonding agent layer (adhesive agent layer)
10: Liquid crystal cell
11: Upper polarizing plate
12: Lower polarizing plate
13: Protective film
14: Backlight unit

DETAILED DESCRIPTION

Hereinafter, preferred exemplary embodiments of the present invention will be described. However, the exemplary embodiments of the present invention may be modified into various other forms, and the scope of the present invention is not limited to the exemplary embodiments which will be described below. Further, the exemplary embodiments of the present invention are provided to explain the present invention in more detail to a person with ordinary skill in the art.

An exemplary embodiment of the present application provides a retardation film comprising a composition or a cured product thereof, the composition comprising: an acrylate-based resin having a glass transition temperature (Tg) of 120° C.; or more; a retardation adjusting agent comprising a styrene monomer; and a triazine-based birefringence adjusting agent, in which the triazine-based birefringence adjusting agent is included in an amount of more than 5 parts by weight and 15 parts by weight or less, based on 100 parts by weight of the acrylate-based resin.

In the present specification, the glass transition temperature was measured using a differential scanning calorimeter (DSC) apparatus manufactured by METTLER Instrument Corporation, and for the measurement method, 3 mg to 20 mg of a resin to be measured is put into an aluminum crucible, the resin is melted at a heating rate of 10° C./min from 30° C.; to 250° C.; and cooled again to 30° C., and the resin is melted again to 200° C.; at a heating rate of 10° C./min. In this case, an intermediate point within a range of temperature at which heat of the resin changes the specific heat behavior is measured in the process of the second melting by means of the DSC apparatus manufactured by METTLER Instrument Corporation, and this value is measured as the value of the glass transition temperature.

In an exemplary embodiment of the present application, the acrylate-based resin having a glass transition temperature of 120° C.; or more may comprise a (meth)acrylate-based resin having a weight average molecular weight of 100,000 g/mol to 5,000,000 g/mol.

The weight average molecular weight is one of the average molecular weights in which the molecular weight is not uniform and the molecular weight of any polymer material is used as a reference, and is a value obtained by averaging the molecular weight of a component molecular species of a polymer compound having a molecular weight distribution by a weight fraction.

The weight average molecular weight may be measured by gel permeation chromatography (GPC) analysis.

In the present specification, a (meth)acrylate means comprising both an acrylate and a methacrylate. The (meth)acrylate-based resin may be, for example, a copolymer of a (meth)acrylic acid ester-based monomer and a crosslinkable functional group-containing monomer.

The (meth)acrylic acid ester-based monomer is not particularly limited, but examples thereof comprise an alkyl (meth)acrylate, and more specifically, the (meth)acrylic acid ester-based monomer is a monomer comprising an alkyl group having 1 to 12 carbon atoms, and may comprise one or two or more of pentyl(meth)acrylate, n-butyl(meth)acrylate, ethyl (meth)acrylate, methyl (meth)acrylate, hexyl (meth)acrylate, n-octyl(meth)acrylate, isooctyl (meth)acrylate, 2-ethylhexyl (meth)acrylate, dodecyl (meth)acrylate, and decyl (meth)acrylate.

The crosslinkable functional group-containing monomer is not particularly limited, but may comprise, for example, one or two or more of a hydroxy group-containing monomer, a carboxyl group-containing monomer, and a nitrogen-containing monomer.

Examples of the hydroxyl group-containing monomer comprise 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropyleneglycol (meth)acrylate, or the like.

Examples of the carboxyl group-containing monomer comprise (meth)acrylic acid, 2-(meth)acryloyloxyacetic acid, 3-(meth)acryloyloxy propyl acid, 4-(meth)acryloyloxy butyl acid, acrylic acid dimer, itaconic acid, maleic acid, maleic anhydride, or the like.

Examples of the nitrogen-containing monomer may comprise (meth)acrylonitrile, N-vinyl pyrrolidone, N-vinyl caprolactam, or the like.

At least one of vinyl acetate, styrene, and acrylonitrile may also be additionally co-polymerized with the (meth) acrylate-based resin from the viewpoint of improving other functionalities such as compatibility.

In an exemplary embodiment of the present application, the acrylate-based resin having a glass transition temperature of 120° C.; or more may have one or more monomers selected from the group consisting of an N-substituted maleimide structure, a lactone ring structure, and a glutarimide structure in the acrylate molecular chain.

In the acrylate-based resin having a glass transition temperature of 120° C.; or more, the N-substituted maleimide structure, the lactone ring structure, and the glutarimide structure may be confirmed by nuclear magnetic resonance (NMR) measurement.

In an exemplary embodiment of the present application, the N-substituted maleimide structure may be N-phenylmaleimide (PMI).

The monomer in the acrylate molecular chain means may be present in an amount of 1 to 40 parts by weight, preferably 5 to 30 parts by weight, and more preferably 5 to 20 parts by weight, based on 100 parts by weight of the acrylic resin. When the monomer is included in the acrylate molecular chain, a copolymer may be formed.

The copolymer refers to an article obtained by polymerizing two or more different units, and in the copolymer, two or more units may be arranged irregularly or regularly.

The copolymer may be a random copolymer having a form in which monomers are mixed with one another without any rules, a block copolymer in which blocks aligned at a constant interval are repeated, or an alternating copolymer having a form in which monomers are alternately repeated and polymerized. The acrylate-based resin having a glass transition temperature of 120° C.; or more according to an exemplary embodiment of the present application may be a random copolymer, a block copolymer, or an alternating copolymer.

In an exemplary embodiment of the present application, the acrylate-based resin having a glass transition temperature of 120° C.; or more may be lactone-methyl methacrylate (MMA), maleimide-MMA, or glutarimide-MMA.

In an exemplary embodiment of the present application, the acrylate-based resin may have a glass transition temperature of 120° C.; or more, preferably 125° C. or more and 150° C.; or less, preferably 145° C.; or less.

In an exemplary embodiment of the present application, the retardation adjusting agent comprising a styrene monomer may be styrene-acrylonitrile (SAN).

When styrene is used alone as the retardation adjusting agent, compatibility with the acrylate-based resin is not exhibited, but the compatibility with the acrylate-based resin may be sufficient by using styrene-acrylonitrile (SAN) in which styrene is used together with acrylonitrile.

In an exemplary embodiment of the present application, the retardation adjusting agent may be included in an amount of 15 parts by weight to 80 parts by weight based on 100 parts by weight of the acrylate-based resin.

In another exemplary embodiment, the retardation adjusting agent may be included in an amount of 20 parts by weight to 80 parts by weight, preferably 30 parts by weight to 75 parts by weight, based on 100 parts by weight of the acrylate-based resin.

When the retardation adjusting agent is included within the above range, the retardation film has a feature capable of implementing the reverse wavelength/flat wavelength dispersion property by changing the wavelength dispersion property to a suitable range. Furthermore, when the content of the retardation adjusting agent exceeds the parts by weight within the above range, the glass transition temperature of the retardation film composition is lowered, which may cause a disadvantage in that the heat resistance deteriorates.

An exemplary embodiment of the present application provides a retardation film in which a triazine-based birefringence adjusting agent is included in an amount of more than 5 parts by weight and 15 parts by weight or less based on 100 parts by weight of the acrylate-based resin.

In another exemplary embodiment, the triazine-based birefringence adjusting agent may be included in an amount of 5.5 parts by weight to 14 parts by weight, preferably 6.5 parts by weight to 13 parts by weight, based on 100 parts by weight of the acrylate-based resin.

In the present application, the triazine-based birefringence adjusting agent included in the retardation film is used not for the general purpose of blocking UV, but for the purpose of changing the wavelength dispersion property by using the difference in refractive index from the acrylic resin.

When the triazine-based birefringence adjusting agent is included within the above content range, the wavelength dispersion property of the retardation film is lowered to 1.0 or less, so that the retardation film has a feature in which the flat/reverse dispersion may be implemented in general forward dispersion, and optical characteristics are excellent. The retardation film has disadvantages in that when the parts by weight of the triazine-based birefringence adjusting agent is smaller than the above range, the wavelength dispersion property does not have the flat dispersion/reverse dispersion, but has the forward dispersion. When the parts by weight of the triazine-based birefringence adjusting agent is larger than the above range, the expression of the retardation is small, so that it is difficult to express sufficient retardation.

In an exemplary embodiment of the present application, as the triazine-based birefringence adjusting agent, a 2-hydroxyphenyl-s-triazine derivative may be used, and specific examples thereof comprise Tinuvin 1600, Tinuvin 460, Tinuvin477, Tinuvin479, and Tinuvin1577, which are manufactured by BASF SE and/or LA-F170 and LA46 manufactured by ADEKA Corporation, and the like, but are not limited thereto.

In an exemplary embodiment of the present application, the triazine-based birefringence adjusting agent may be represented by the following Formula 1.

[Formula 1]

In Formula 1, $L_1$ to $L_3$ are the same as or different from each other, and are each independently a direct bond; a substituted or unsubstituted arylene group; or a substituted or unsubstituted heteroarylene group, $Z_1$ to $Z_3$ are the same as or different from each other, and are each independently hydrogen; a hydroxyl group; a substituted or unsubstituted alkoxy group; a substituted or unsubstituted alkyl group; a substituted or unsubstituted aryl group; or a substituted or unsubstituted heteroaryl group, a, b, and c are the same as or different from each other, and are each independently an integer from 1 to 3, p, q, and r are the same as or different from each other, and are each independently an integer from 1 to 5, and when a, b, c, p, q, and r are an integer of 2 or more, two or more substituents in the parenthesis are the same as or different from each other.

Examples of the substituents will be described below, but are not limited thereto.

In the present specification, the term "substituted or unsubstituted" means being unsubstituted or substituted with one or more substituents selected from the group consisting of an alkoxy group; an alkyl group; an aryl group; and a heterocyclic group, or being unsubstituted or substituted with a substituent to which two or more substituents among the substituents exemplified above are linked. For example, "the substituent to which two or more substituents are linked" may be a biphenyl group. That is, the biphenyl group may also be an aryl group, and may be interpreted as a substituent to which two phenyl groups are linked.

In the present specification, the alkyl group may be straight-chained or branched, and the number of carbon atoms thereof is not particularly limited, but is preferably 1 to 40. According to an exemplary embodiment, the number of carbon atoms of the alkyl group is 1 to 20. According to another exemplary embodiment, the number of carbon atoms of the alkyl group is 1 to 10. According to still another exemplary embodiment, the number of carbon atoms of the alkyl group is 1 to 6. Specific examples of the alkyl group comprise a methyl group, an ethyl group, a propyl group, an n-propyl group, an isopropyl group, a butyl group, an n-butyl group, an isobutyl group, a tert-butyl group, a sec-butyl group, a 1-methyl-butyl group, an 1-ethyl-butyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethyl-propyl group, a 1,1-dimethyl-propyl group, an isohexyl group, a 4-methylhexyl group, a 5-methylhexyl group, and the like, but are not limited thereto.

In the present specification, the alkoxy group may be straight-chained, branched, or cyclic. The number of carbon atoms of the alkoxy group is not particularly limited, but is preferably 1 to 40. Specific examples thereof comprise methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

A substituent comprising an alkyl group, an alkoxy group, and other alkyl group moieties described in the present specification comprises both a straight-chained form and a branch-chained form.

In the present specification, an aryl group is not particularly limited, but has preferably 6 to 60 carbon atoms, and may be a monocyclic aryl group or a polycyclic aryl group. According to an exemplary embodiment, the number of carbon atoms of the aryl group is 6 to 30. According to an exemplary embodiment, the number of carbon atoms of the aryl group is 6 to 20. Examples of the monocyclic aryl group comprise a phenyl group, a biphenyl group, a terphenyl group, and the like, but are not limited thereto. Examples of the polycyclic aryl group comprise a naphthyl group, an anthracenyl group, a phenanthryl group, a pyrenyl group, a perylenyl group, a triphenyl group, a chrysenyl group, a fluorenyl group, and the like, but are not limited thereto.

In the present specification, a heterocyclic group is a heterocyclic group comprising one or more of N, O, P, S, Si, and Se as a hetero atom, and the number of carbon atoms thereof is not particularly limited, but is preferably 1 to 60. According to an exemplary embodiment, the number of carbon atoms of the heterocyclic group is 1 to 30. Examples of the heterocyclic group comprise a pyridyl group, a pyrrole group, a pyrimidyl group, a pyridazinyl group, a furanyl group, a thiophenyl group, an imidazole group, a pyrazole group, an oxazole group, an isooxazole group, a thiazole group, an isothiazole group, a triazole group, an oxadiazole group, a thiadiazole group, a dithiazole group, a tetrazole group, a pyranyl group, a thiopyranyl group, a pyrazinyl group, an oxazinyl group, a thiazinyl group, a dioxynyl group, a triazinyl group, a tetrazinyl group, a quinolinyl group, an isoquinolinyl group, a quinolyl group, a quinazolinyl group, a quinoxalinyl group, a naphthyridinyl group, an acrydyl group, a xanthenyl group, a phenanthridinyl group, a diaza naphthalenyl group, a triazaindenyl group, an indole group, an indolinyl group, an indolizinyl group, a phthalizinyl group, a pyrido pyrimidinyl group, a pyrido pyrazinyl group, a pyrazino pyrazinyl group, a benzothiazole group, a benzoxazole group, a benzimidazole group, a benzothiophene group, a benzofuranyl group, a dibenzothiophenyl group, a dibenzofuranyl group, a carbazole group, a benzocarbazole group, a dibenzocarbazole group, an indolocarbazole group, an indenocarbazole group, a phenazinyl group, an imidazopyridine group, a phenoxazinyl group, a phenanthridine group, a phenanthroline group, a phenothiazine group, an imidazopyridine group, an imidazophenanthridine group, a benzoimidazoquinazoline group, a benzoimidazophenanthridine group, and the like, but are not limited thereto.

In the present specification, the above-described description on the heterocyclic group may be applied to a heteroaryl group except for an aromatic heteroaryl group.

In the present specification, the above-described description on the aryl group may be applied to arylene except for a divalent arylene group.

In an exemplary embodiment of the present application, $L_1$ to $L_3$ may be a direct bond; or a substituted or unsubstituted arylene group having 6 to 60 carbon atoms.

In another exemplary embodiment, $L_1$ to $L_3$ may be a direct bond; or a substituted or unsubstituted arylene group having 6 to 40 carbon atoms.

In still another exemplary embodiment, $L_1$ to $L_3$ may be a direct bond; or a phenylene group.

In an exemplary embodiment of the present application, $Z_1$ to $Z_3$ may be hydrogen; a hydroxyl group; a substituted or unsubstituted aryl group having 6 to 60 carbon atoms; or a substituted or unsubstituted alkoxy group.

In another exemplary embodiment, $Z_1$ to $Z_3$ may be hydrogen; a hydroxyl group; a substituted or unsubstituted aryl group having 6 to 40 carbon atoms; or a substituted or unsubstituted alkoxy group.

In still another exemplary embodiment, $Z_1$ to $Z_3$ may be hydrogen; a hydroxyl group; an aryl group having 6 to 40 carbon atoms; or an alkoxy group which is unsubstituted or substituted with an alkyl group having 1 to 40 carbon atoms.

In yet another exemplary embodiment, $Z_1$ to $Z_3$ may be hydrogen; a hydroxyl group; a phenyl group; or an alkoxy group which is unsubstituted or substituted with a branched alkyl group having 1 to 10 carbon atoms.

In an exemplary embodiment of the present application, Formula 1 may be represented by the following Formula 2.

[Formula 2]

In Formula 2, the definitions of $Z_1$ to $Z_3$, p, q, and r are the same as the definitions in Formula 1.

In an exemplary embodiment of the present application, at least one of $Z_1$ to $Z_3$ may be a substituted or unsubstituted aryl group.

In particular, the case where at least one of $Z_1$ to $Z_3$ has a phenyl group has a difference in birefringence more remarkably exhibited than the case where at least one of $Z_1$ to $Z_3$ does not have a phenyl group, and due to the difference in structure between the triazine-based birefringence adjusting agents, even when the triazine-based birefringence adjusting agent in which $Z_1$ to $Z_3$ do not have a phenyl group is included in an excessive amount, the effects thereof are exhibited at a low level.

In particular, in an exemplary embodiment of the present application, when Tinuvin 1600 (2-hydroxyphenyl-s-triazine derivative) manufactured by BASF SE is used as a triazine-based birefringence adjusting agent, the effect of improving the wavelength dispersion property is exhibited most remarkably as compared to the similar content, which may result from the difference in birefringence caused by the difference in structure.

The contents and components of the acrylate-based resin having a glass transition temperature of 120° C.; or more; the retardation adjusting agent comprising a styrene monomer; and the triazine-based birefringence adjusting agent according to the present application may be confirmed by nuclear magnetic resonance (NMR) and gas chromatography (GC) analyses.

An exemplary embodiment of the present application provides a retardation film in which a dichroism value of the triazine-based birefringence adjusting agent in a wavelength region of 200 nm to 400 nm satisfies the following Equation 1.

$$0.01 \leq |\alpha_e - \alpha_o| \leq 0.05 \quad \text{[Equation 1]}$$

In Equation 1,
$\alpha_e$ is an extinction coefficient of an extraordinary ray, and $\alpha_o$ is an extinction coefficient of an ordinary ray.

In the present invention, the extinction coefficient $\alpha_e$ of the extraordinary ray and the extinction coefficient $\alpha_o$ of the ordinary ray may be calculated by measuring the polarized light transmittance of a film comprising a triazine-based birefringence adjusting agent. For example, after a polarized light is generated by attaching a polarizing plate to a light source of a transmittance measurement device (for example, U-3310 manufactured by Hitachi, Ltd., and the like), the transmittance $T_o$ of an ordinary ray is measured by allowing the polarized light to pass through a sample film, and then the transmittance $T_e$ of an extraordinary ray is measured by allowing the polarized light to pass through the sample film in a state where the sample film is rotated at 90°. And then, the extinction coefficients of the ordinary ray and the extraordinary ray may be calculated by substituting the following equation with the measured transmittances of the ordinary ray and the extraordinary ray, respectively.

$$-\text{Log } T = \alpha bc$$

(T: transmittance, $\alpha$: extinction coefficient, b: sample thickness, and c: concentration of triazine-based birefringence adjusting agent)

In an exemplary embodiment of the present application, the retardation film provides a retardation film satisfying the following Equations 2 and 3.

$$0.7 \leq R_{in}(450)/R_{in}(550) \leq 1.0 \quad \text{[Equation 2]}$$

$$1.0 \leq R_{in}(650)/R_{in}(550) \leq 1.1 \quad \text{[Equation 3]}$$

In Equations 2 and 3,
$R_{in}(450)$ is retardation in the in-plane direction at a wavelength of 450 nm and a value of $(n_x - n_y) \times d$,
$n_x$ is the refractive index of the retardation film surface in the slow axis direction,
$n_y$ is the refractive index of the retardation film surface in the fast axis direction, and
d is the thickness of the retardation film.

In Equations 2 and 3, $R_{in}(\lambda)$ is obtained by measuring the retardation in the in-plane direction at a wavelength of $\lambda$ nm, and is a value measured using Axoscan manufactured by Axometrics, Inc. That is, in Equations 2 and 3, $R_{in}(450)$, $R_{in}(550)$, and $R_{in}(650)$ mean the retardation values in the in-plane direction at 450 nm, 550 nm, and 650 nm, respectively.

The retardation in the in-plane direction at each wavelength is a value determined by the difference between the refractive index in the slow axis direction and the refractive index in the fast axis direction and the thickness of the retardation film, as seen in the aforementioned explanation on Equations 2 and 3. The slow axis and the fast axis are determined according to the orientation direction of a polymer chain of a retardation film, the direction in which the orientation of the polymer chain becomes large is referred to as the slow axis, and it takes a long time for light to pass through at each wavelength, so that the direction in which the retardation delay is the largest is referred to as the slow axis. The fast axis is a concept opposite to the slow axis, the direction in which the orientation of the polymer chain becomes small is referred to as the fast axis, and it takes a short time for light to pass through at each wavelength, so that the direction in which the retardation delay is the smallest is referred to as the fast axis.

In Equation 2, the retardation in the in-plane direction at a wavelength of 550 nm may be referred to as $R_{in}(550)$, and the retardation in the in-plane direction at a wavelength of 450 nm may be referred to as $R_{in}(450)$. The case where $R_{in}(450)/R_{in}(550)$, which is a retardation ratio at the two wavelengths, becomes 1 or less indicates the reverse wavelength dispersion, the case where $R_{in}(450)/R_{in}(550)$ is 1 indicates the flat wavelength dispersion, and the case where $R_{in}(450)/R_{in}(550)$ has a value of more than 1 indicates the forward wavelength dispersion.

It can be seen that in the same manner as in Equation 2, Equation 3 also indicates the reverse wavelength dispersion/ the flat wavelength dispersion when $R_{in}(650)/R_{in}(550)$ has a range of Equation 3.

Furthermore, in an exemplary embodiment of the present application, the retardation film provides a retardation film satisfying the following Equations 4 and 5.

$$0 \text{ nm} \leq R_{in}(550) \leq 300 \text{ nm} \quad \text{[Equation 4]}$$

$$40 \text{ nm} \leq R_{th}(550) \leq 300 \text{ nm} \quad \text{[Equation 5]}$$

In Equations 4 and 5, $R_{in}(550)$ is a retardation in the in-plane direction at a wavelength of 550 nm and a value of $(n_x-n_y) \times d$, $R_{th}(550)$ is a retardation in the thickness direction at a wavelength of 550 nm and a value of $\{n_z-(n_x+n_y)/2\} \times d$, $n_x$ is the refractive index of the retardation film surface in the slow axis direction, $n_y$ is the refractive index of the retardation film surface in the fast axis direction, $n_z$ is the refractive index of the retardation film in the thickness direction, and d is the thickness of the retardation film.

In Equations 4 and 5, $R_{in}(\lambda)$ is obtained by measuring the retardation in the in-plane direction at a wavelength of λ nm, and is a value measured using Axoscan manufactured by Axometrics, Inc. Furthermore, $R_{th}(\lambda)$ is the retardation in the thickness direction at a wavelength of λ nm, is obtained by measuring the refractive index in the thickness direction by an AxoScan apparatus, and is a value determined by the value of difference from the average of the in-plane direction refractive indices and the thickness.

In an exemplary embodiment of the present application, the retardation film may have a thickness of 10 μm to 100 μm.

In another exemplary embodiment, the retardation film may have a thickness of 10 μm to 100 μm, preferably 15 μm to 95 μm, and more preferably 15 μm to 80 μm.

As can be seen in Equations 2 to 5, the retardation value varies according to the thickness of the retardation film, and in the present application, when the thickness of the retardation film has the above range, the retardation film has the flat dispersion/reverse dispersion.

In an exemplary embodiment of the present application, the composition of the retardation film may have a glass transition temperature of 115° C.; or more.

The fact that the composition has a glass transition temperature of 115° C.; or more means the glass transition temperature of a composition comprising: an acrylate-based resin having a glass transition temperature (Tg) of 120° C. or more; a retardation adjusting agent comprising a styrene monomer; and a triazine-based birefringence adjusting agent, and the measurement method thereof is the same as that described above.

In an exemplary embodiment of the present application, the composition of the retardation film may have a glass transition temperature of 115° C.; or more, preferably 118° C.; or more.

In an exemplary embodiment of the present application, the composition of the retardation film may have a glass transition temperature of 150° C.; or less, preferably 130° C.; or less.

The retardation film according to the present application comprises an acrylate-based resin having a glass transition temperature of 120° C.; or more, so that the glass transition temperature value of the composition may maintain the above range, and the resulting retardation film has a characteristic in which the heat resistance is excellent.

An exemplary embodiment of the present application provides a retardation film having the wavelength dispersion property of 0.1 to 1.0.

In another exemplary embodiment, the retardation film may have the wavelength dispersion property of 0.1 to 1.0, preferably 0.6 to 1.0.

Meanwhile, a method for manufacturing the retardation film of the present invention, which has the characteristics described above, is not particularly limited, and the retardation film of the present invention may be manufactured by a method of preparing the composition, and then film-molding the same, and stretching the same.

The composition is, for example, prepared by pre-blending the film raw materials by using any appropriate mixer such as an omni-mixer, and then extrusion-kneading the obtained mixture. In this case, the mixer used in extrusion-kneading is not particularly limited, and it is possible to use any appropriate mixer such as, for example, an extruder such as a single-screw extruder and a twin-screw extruder or a pressure kneader.

Examples of the film-molding method comprise any appropriate film-molding method such as a solution cast method (solution casting method), a melt extrusion method, a calendaring method, and a compression molding method. Among the film-molding methods, a solution cast method (solution casting method) and a melt extrusion method are preferred.

Examples of solvents used in the solution cast method (solution casting method) comprise: aromatic hydrocarbons such as benzene, toluene, and xylene; aliphatic hydrocarbons such as cyclohexane and decaline; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamide; dimethyl sulfoxide; and the like. These solvents may be used alone or in combination of two or more thereof.

Examples of an apparatus for performing the solution cast method (solution casting method) comprise a drum-type casting machine, a band-type casting machine, a spin coater and the like. Meanwhile, examples of the melt extrusion method comprise a T-die method, an inflation method, and the like. The molding temperature may be 150 to 350° C., or 200 to 300° C.

When a film is molded by the T-die method, a T-die is mounted on a front end portion of a publicly-known single- or twin-screw extruder, and a film extruded in a film form is wound, thereby obtaining a roll-shaped film.

After a film is formed by the aforementioned process, the film is stretched. For the stretching process, the stretching in the machine direction (MD) and the stretching in the transverse direction (TD) may be separately performed, and may also be all performed. Further, when the stretching in the machine direction and the stretching in the transverse direction are all performed, any one stretching may be first performed, and then the other may also be performed, and the stretching may be simultaneously performed in both directions. Further, the stretching may also be performed in one step, and may also be performed through multi-steps. In the case of the stretching in the machine direction, the stretching by the difference in speed between rolls may be performed, and in the case of the stretching in the transverse direction, a tenter may be used. The rail initiating angle of the tenter is typically within 10°, so that a bowing phenomenon that occurs during the stretching in the transverse direction is suppressed, and the angle of the optical axis is regularly controlled. Even when the stretching in the transverse direction is performed through multi-steps, the effect of suppressing bowing may be obtained.

It is preferred that the stretching temperature is within a range around the glass transition temperature of the composition which is a film raw material, and when the glass transition temperature of the composition is defined as Tg, the stretching temperature is within a range of preferably (Tg−30° C.) to (Tg+100° C.), more preferably (Tg−20° C.) to (Tg+80° C.), and even more preferably (Tg−5° C.) to (Tg+20° C.). When the stretching temperature is less than (Tg−30° C.), there is a concern in that a sufficient stretching ratio may not be obtained. In contrast, when the stretching temperature is more than (Tg+100° C.), there is a concern in that the flow of the resin composition occurs, and thus, stable stretching may not be performed.

Further, in an exemplary embodiment of the present application, the stretching ratio in the stretching of the film may be 1.05 to 10 times based on the length in the stretching direction.

In addition, the film may be stretched so that the total stretching ratio becomes 1.1 times or more, 1.2 times or more, or 1.5 times or more, and 25 times or less, 10 times or less, or 7 times or less, based on the total stretching area of the base film. When the stretching ratio is less than 1.1 times, the effect of stretching may not be sufficiently achieved, and when the stretching ratio is more than 25 times, the film layer may be cracked.

Before the stretching, a process of drying the composition may be further performed in order to planarize a surface to which the composition is applied and volatilize the solvent included in the composition.

In order to stabilize optical isotropy or mechanical properties of the retardation film, the retardation film may be subjected to a heat treatment (annealing) and the like after the stretching treatment. Conditions for the heat treatment are not particularly limited, and it is possible to adopt any appropriate conditions known to a person with ordinary skill in the art of the present invention.

The retardation film of the present invention described above is applied to a polarizing plate and/or a liquid crystal display device, and thus may be usefully used. In an exemplary embodiment of the present invention, the present invention provides a polarizing plate comprising: a polarizer; and one or more retardation films according to the present application.

Figure 1:
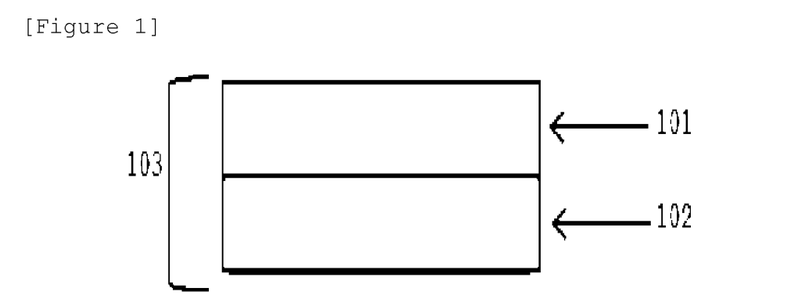
FIG. 1 is a view illustrating the laminate structure of a polarizing plate according to an exemplary embodiment of the present application.

FIG. 1 is a view illustrating the laminate structure of a polarizing plate 103 according to an exemplary embodiment of the present application. Specifically, the polarizing plate 103 has a structure in which a polarizer 102 and a retardation film 101 provided on one surface of the polarizer are laminated.

In an exemplary embodiment of the present application, the polarizer is not particularly limited, and a polarizer well-known in the art, for example, a film composed of polyvinyl alcohol (PVA) comprising iodine or a dichroic dye is used.

The polarizer exhibits a characteristic capable of extracting only light oscillating in one direction from light incident while oscillating in various directions. This characteristic may be achieved by stretching an iodine-absorbed polyvinyl alcohol (PVA) under high tension. For example, more specifically, a polarizer may be formed by a step of swelling a PVA film by immersing the PVA film in an aqueous solution, a step of dyeing the swollen PVA film with a dichroic substance imparting a polarization property to the swollen PVA film, a stretching step of arranging the dichroic dye substance in parallel with the stretching direction by stretching the dyed PVA film, and a color correcting step of correcting the color of the PVA film subjected to the stretching step. However, the polarizing plate of the present invention is not limited thereto.

In an exemplary embodiment of the present application, the polarizer and the retardation film may be bonded with a bonding agent or an adhesive agent, and an available bonding or adhesive agent is not particularly limited as long as the bonding or adhesive agent are known in the art. Examples thereof comprise a water-based bonding agent, a one liquid-type or two liquid-type polyvinyl alcohol (PVA)-based bonding agent, a polyurethane-based bonding agent, an epoxy-based bonding agent, a styrene butadiene rubber-based (SBR-based) bonding agent, a hot melt-type bonding agent, and the like, but the present invention is not limited to these examples.

The retardation film may be directly attached onto one surface or both surfaces of a polarizer. Further, the retardation film may be attached onto a protective film of a polarizing plate in the related art, in which the protective film is attached onto both surfaces of a polarizer, and thus may be usefully used as a retardation film.

When the retardation film is directly attached onto one surface or both surfaces of a polarizer, for example, the structure thereof may be an upper protective film/a polarizer/a retardation film or a retardation film/a polarizer/a lower protective film. The attachment method may be performed by a method of coating the surface of a retardation film or a polarizer with a primer using a roll coater, a gravure coater, a bar coater, a knife coater, a capillary coater, a micro chamber doctor blade coater, or the like, spraying a bonding agent thereon by a drip method, and then heating and laminating a laminate comprising the retardation film and the polarizer with a lamination roll, a method of laminating the laminate by compressing the laminate at room temperature, or a method of UV curing the laminate.

Figure 2:
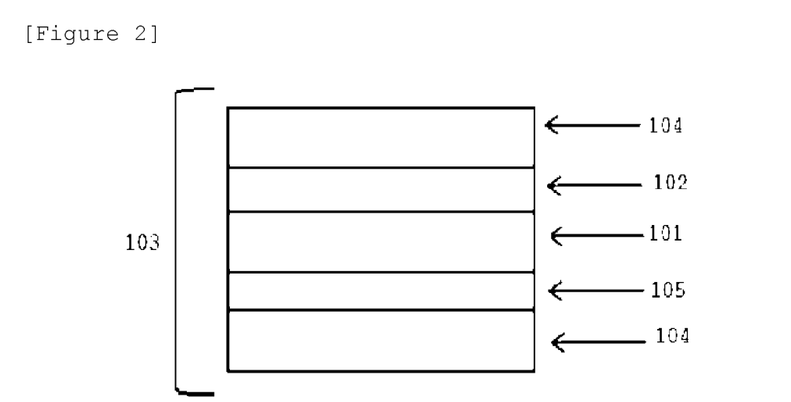
FIG. 2 is a view illustrating the laminate structure of a polarizing plate according to another exemplary embodiment of the present application.

FIG. 2 is a view illustrating the laminate structure of a polarizing plate according to another exemplary embodiment of the present application. Specifically, a polarizing plate 103 may have a structure in which a polarizer protection film 104/a bonding agent layer (adhesive agent layer) 105/a retardation film 101/a polarizer 102/a polarizer protection film 104 are laminated in this order, and the polarizer protection film may comprise the retardation film according to the present application.

It can be confirmed that the retardation film according to an exemplary embodiment of the present application is positioned while being brought into contact with a polarizer, and has a main purpose of improving the function of the panel as a function of expressing the retardation, instead of a purpose of blocking and absorbing UV rays, as illustrated in FIG. 2.

An exemplary embodiment of the present application provides a polarizing plate in which a polarizer protection film is attached onto one surface of the polarizer and the retardation film according to the present application is attached onto a surface opposite to the surface of the polarizer onto which the polarizer protection film is attached.

In an exemplary embodiment of the present application, in the polarizing plate, the polarizer protection film may be bonded onto a surface opposite to the surface of the retardation film with which the polarizer is brought into contact, and may be bonded through the bonding agent layer (adhesive agent layer).

In an exemplary embodiment of the present application, the polarizer protection film may be composed of any one or more of a cycloolefin polymer (COP)-based film, an acrylic film, a triacetylcellulose (TAC)-based film, a cycloolefin copolymer (COC)-based film, a polynorbornene (PNB)-based film, and a polyethylene terephthalate (PET)-based film.

An exemplary embodiment of the present application provides a liquid crystal display device comprising the polarizing plate.

Further, an exemplary embodiment of the present application provides a liquid crystal display device comprising: a liquid crystal cell; an upper polarizing plate provided on an upper part of the liquid crystal cell; a lower polarizing plate provided on a lower part of the liquid crystal cell; and a backlight unit provided on a lower part of the lower polarizing plate, in which at least one of the upper polarizing plate and the lower polarizing plate comprises: a polarizer; and the retardation film according to an exemplary embodiment of the present application, disposed on one surface of the polarizer.

An exemplary embodiment of the present application provides a liquid crystal display device in which the upper polarizing plate comprises: the polarizer; and the retardation film, and the retardation film is disposed so as to face the liquid crystal cell.

An exemplary embodiment of the present application provides a liquid crystal display device in which the lower polarizing plate comprises: the polarizer; and the retardation film, and the retardation film is disposed so as to face the backlight unit.

The configuration that the upper polarizing plate comprises: the polarizer; and the retardation film, and the retardation film is disposed so as to face the liquid crystal cell means that the upper polarizing plate comprises: the polarizer; and the retardation film, and in this case, the retardation film is disposed in the direction of the liquid crystal cell in the liquid crystal display device, and specifically means that the liquid crystal display device has a structure in which a backlight unit/a lower polarizing plate/a liquid crystal cell/a retardation film/a polarizer are laminated in this order The configuration that the lower polarizing plate comprises: the polarizer; and the retardation film, and the retardation film is disposed so as to face the backlight unit means that the lower polarizing plate comprises: the polarizer; and the retardation film, and in this case, the retardation film is disposed in the direction of the backlight unit in the liquid crystal display device, and specifically means that the liquid crystal display device has a structure in which a backlight unit/a polarizer/a retardation film/a liquid crystal cell/an upper polarizing plate are laminated in this order.

In the liquid crystal display device according to the present application, when the retardation film of the upper polarizing plate is disposed so as to face the liquid crystal cell, or the retardation film of the lower polarizing plate is disposed so as to face the backlight unit, the triazine-based birefringence adjusting agent included in the retardation film may have a main purpose of improving the function of the panel as a function of expressing the retardation, instead of the main function of absorbing UV rays.

The backlight unit comprises a light source which emits light from the rear surface of a liquid crystal panel, and the type of light source is not particularly limited, and a general light source for LCD, such as CCFL, HCFL, or LED may be used.

Figure 3:
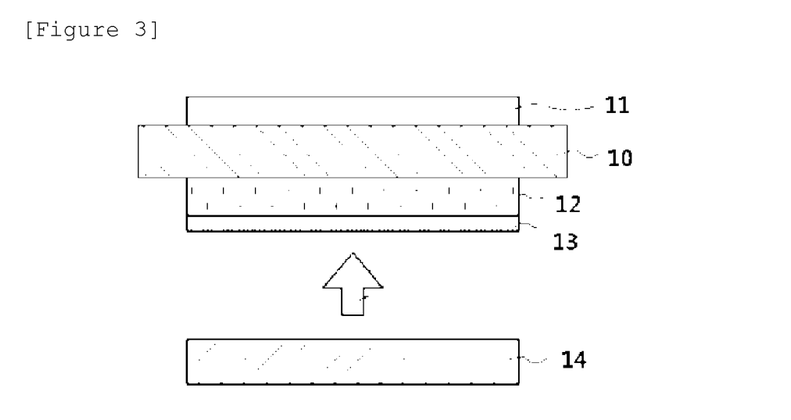
FIG. 3 is a view illustrating a liquid crystal display device according to an exemplary embodiment of the present application.

FIG. 3 is a view illustrating a liquid crystal display device according to an exemplary embodiment of the present application. Specifically, the liquid crystal display device may have a structure in which an upper polarizing plate 11 and a lower polarizing plate 12 may be laminated on both surfaces of a liquid crystal cell 10, respectively, and a protective film 13 is laminated on a surface opposite to the surface of the lower polarizing plate 12 close to a backlight unit 14, which is brought into contact with the liquid crystal cell 10. The polarizing plate according to an exemplary embodiment of the present application may be used as the upper polarizing plate 11 and the lower polarizing plate 12, and preferably, the polarizing plate according to an exemplary embodiment of the present application may be used as the lower polarizing plate 12.

The content on the protective film is the same as that of the above-described polarizer protection film.

MODE FOR INVENTION

Hereinafter, the operations and effects of the invention will be described in more detail through specific Examples of the present invention. However, these Examples are only presented as an example of the invention, and the scope of the rights of the invention is not defined thereby.

EXAMPLES

Preparation of Composition

The components and weight ratios of the compositions used as examples and comparative examples of the present application are shown in the following Table 1.

TABLE 1

|  | Acrylate resin (content) | Retardation adjusting agent (content) | Triazine-based birefringence adjusting agent (content) | Maximum value of dichroism | Glass transition temperature of composition |
| --- | --- | --- | --- | --- | --- |
| Example 1 | Lactone-MMA (100 parts by weight) | SAN (57.4 parts by weight) | Tinuvin1600 (6.6 parts by weight) | 0.028 | 119° C. |
| Example 2 | Lactone-MMA (100 parts by weight) | SAN (65.9 parts by weight) | Tinuvin1600 (7.5 parts by weight) | 0.031 | 118° C. |
| Example 3 | PMI-MMA (100 parts by weight) | SAN (66.3 parts by weight) | Tinuvin1600 (8.2 parts by weight) | 0.027 | 118° C. |

TABLE 1-continued

|  | Acrylate resin (content) | Retardation adjusting agent (content) | Triazine-based birefringence adjusting agent (content) | Maximum value of dichroism | Glass transition temperature of composition |
|---|---|---|---|---|---|
| Example 4 | PMI-MMA (100 parts by weight) | SAN (71.2 parts by weight) | Tinuvin1600 (6.8 parts by weight) | 0.034 | 120° C. |
| Example 5 | Lactone-MMA (100 parts by weight) | SAN (65.9 parts by weight) | LA-F70 (11.5 parts by weight) | 0.027 | 118° C. |
| Comparative Example 1 | PMMA (100 parts by weight) | SAN (42.9 parts by weight) | — | 0 | 110° C. |
| Comparative Example 2 | PMMA (100 parts by weight) | SAN (33.3 parts by weight) | — | 0 | 112° C. |
| Comparative Example 3 | PMMA (100 parts by weight) | SAN (41.1 parts by weight) | Tinuvin1600 (5.9 parts by weight) | 0.029 | 107° C. |
| Comparative Example 4 | PMMA (100 parts by weight) | SAN (43.8 parts by weight) | Tinuvin1600 (7.3 parts by weight) | 0.035 | 106° C. |
| Comparative Example 5 | Lactone-MMA (100 parts by weight) | SAN (59.0 parts by weight) | Tinuvin1600 (4.9 parts by weight) | 0.023 | 120° C. |
| Comparative Example 6 | Lactone-MMA (100 parts by weight) | SAN (58.5 parts by weight) | Tinuvin1600 (4.1 parts by weight) | 0.018 | 121° C. |

In Table 1, as the triazine-based birefringence adjusting agent, Tinuvin1600 manufactured by BASF SE or LA-F70 manufactured by ADEKA Corporation was used. The retardation films were manufactured by stretching the compositions having the compositions and weight ratios in Table 1 under the conditions in the following Table 2.

TABLE 2

|  | Stretching temperature | Stretching ratio (MD/TD) |
|---|---|---|
| Example 1 | Tg + 8° C. | 1.35/3.5 |
| Example 2 | Tg + 9° C. | 1.35/3.5 |
| Example 3 | Tg + 9° C. | 1.35/3.45 |
| Example 4 | Tg + 9° C. | 1.35/3.45 |
| Example 5 | Tg + 9° C. | 1.35/3.5 |
| Comparative Example 1 | Tg + 9° C. | 1.35/3.45 |
| Comparative Example 2 | Tg + 9° C. | 1.35/3.45 |
| Comparative Example 3 | Tg + 9° C. | 1.35/3.45 |
| Comparative Example 4 | Tg + 9° C. | 1.35/3.45 |
| Comparative Example 5 | Tg + 8° C. | 1.35/3.5 |
| Comparative Example 6 | Tg + 4° C. | 1.4/3.48 |

The results of measuring film physical properties and heat resistances of the retardation films in Examples 1 to 5 and Comparative Examples 1 to 6 are shown in the following Table 3.

TABLE 3

|  | Film physical properties | | Heat resistance@90° C. for 100 h |
|---|---|---|---|
|  | $R_{in}/R_{th}$ | RD450/RD650 | $R_{in}/R_{th}$ |
| Example 1 | 118/119 | 0.956/1.003 | 118/118 |
| Example 2 | 112/113 | 0.947/1.001 | 111/112 |
| Example 3 | 117/116 | 0.959/1.005 | 117/117 |
| Example 4 | 115/114 | 0.944/1.002 | 115/113 |
| Example 5 | 117/119 | 0.958/1.003 | 116/117 |
| Comparative Example 1 | 116/117 | 1.059/0.967 | 105/101 |
| Comparative Example 2 | 119/118 | 1.061/0.969 | 102/103 |
| Comparative Example 3 | 108/108 | 0.954/1.002 | 91/89 |
| Comparative Example 4 | 104/105 | 0.943/1.002 | 87/89 |
| Comparative Example 5 | 124/125 | 1.016/0.987 | 122/122 |
| Comparative Example 6 | 129/127 | 1.031/0.977 | 128/126 |

As can be seen in Table 3, it could be confirmed that in the case of each of Examples 1 to 5, the retardation film having a high glass transition temperature, excellent heat resistance due to the high glass transition temperature, and the reverse wavelength dispersion was obtained by using an acrylate-based resin having a high glass transition temperatures and adding a constant content or more of a UV absorbent thereto.

In contrast, it can be confirmed that in the case of each of Comparative Examples 1 and 2 of Table 3, by using a general polymethyl methacrylate (PMMA) having a low glass transition temperature as an acrylate-based resin, and not including a triazine-based birefringence adjusting agent, the heat resistance is insufficient due to the low glass transition temperature and the wavelength dispersion property also exhibits the forward wavelength dispersion.

It could be seen that Comparative Examples 3 and 4 of Table 3 were the cases where PMMA having a low glass transition temperature was used and a sufficient amount of triazine-based birefringence adjusting agent was added, and the wavelength dispersion property exhibited the reverse wavelength dispersion, which was good, but the heat resistance deteriorated due to low glass transition temperature.

It could be confirmed that Comparative Examples 5 and 6 of Table 3 were cases where the glass transition temperature was high, but the content of the triazine-based birefringence adjusting agent was not sufficient. Here an acrylic resin having a high glass transition temperature exhibited a wavelength dispersion property of 1.0 or more, and thus exhibited the forward wavelength dispersion instead of reverse wavelength/flat wavelength dispersion.

In particular, it could be confirmed that Examples 1 to 4 of Table 3 are the cases where Tinuvin1600 manufactured by BASF SE was used as the triazine-based birefringence adjusting agent, the number of benzene rings in the molecule was high (corresponding to the case where at least one of $Z_1$ to $Z_3$ in Formula 1 of the present application is a phenyl group), and as a result, the difference in birefringence in the stretching process was particularly excellent. That is, it can be seen that in Example 5 of Table 3, a higher content of triazine-based birefringence adjusting agent was used in Example 5 in order to exhibit an effect similar to that in the case where Tinuvin1600 manufactured by BASF SE was added as the triazine-based birefringence adjusting agent. This results from the difference in structure between two triazine-based birefringence adjusting agents.

For reference, in Table 3, RD450 means a value meaning $R_{in}(450)/R_{in}(550)$, RD650 is a value meaning $R_{in}(650)/R_{in}(550)$, and $R_{in}(\lambda)$ is obtained by measuring the retardation in the in-plane direction at a wavelength of $\lambda$ nm and a value measured using Axoscan manufactured by Axometrics, Inc.

The invention claimed is:

1. A retardation film comprising a composition or a cured product thereof, the composition comprising:
    an acrylate-based resin having a glass transition temperature (Tg) of 120° C. or more;
    a retardation adjusting agent comprising a styrene monomer; and
    a triazine-based birefringence adjusting agent,
    wherein the triazine-based birefringence adjusting agent is present in an amount of more than 5 parts by weight and 15 parts by weight or less, based on 100 parts by weight of the acrylate-based resin.

2. The retardation film of claim 1, wherein a dichroism value of the triazine-based birefringence adjusting agent in a wavelength region of 200 nm to 400 nm satisfies the following Equation 1:

$$0.01 \le |\alpha_e - \alpha_0| \le 0.05 \quad \text{[Equation 1]}$$

in Equation 1,
$\alpha_e$ is an extinction coefficient of an extraordinary ray, and
$\alpha_0$ is an extinction coefficient of an ordinary ray.

3. The retardation film of claim 1, wherein the acrylate-based resin having a glass transition temperature of 120° C. or more has one or more monomers in an acrylate molecular chain selected from the group consisting of an N-substituted maleimide structure, a lactone ring structure, and a glutarimide structure.

4. The retardation film of claim 1, wherein the retardation adjusting agent is present in an amount of 15 parts by weight to 80 parts by weight based on 100 parts by weight of the acrylate-based resin.

5. The retardation film of claim 1, wherein the retardation film satisfies the following Equations 2 and 3:

$$0.7 \le R_{in}(450)/R_{in}(550) \le 1.0 \quad \text{[Equation 2]}$$

$$1.0 \le R_{in}(650)/R_{in}(550) \le 1.1 \quad \text{[Equation 3]}$$

in Equations 2 and 3,
$R_{in}(450)$ is a retardation in the in-plane direction at a wavelength of 450 nm and a value of $((n_x - n_y) \times d$,
$n_x$ is the refractive index of the retardation film surface in the slow axis direction,
$n_y$ is the refractive index of the retardation film surface in the fast axis direction, and
d is the thickness of the retardation film.

6. The retardation film of claim 1, wherein the retardation film satisfies the following Equations 4 and 5:

$$0 \text{ nm} \le R_{in}(550) \le 300 \text{ nm} \quad \text{[Equation 4]}$$

$$40 \text{ nm} \le R_{th}(550) \le 300 \text{ nm} \quad \text{[Equation 5]}$$

In Equations 4 and 5,
$R_{in}(550)$ is a retardation in the in-plane direction at a wavelength of 550 nm and a value of $(n_x - n_y) \times d$,
$R_{th}(550)$ is a retardation in the thickness direction at a wavelength of 550 nm and a value of $\{n_z - (n_x + n_y)/2\} \times d$,
$n_x$ is the refractive index of the retardation film surface in the slow axis direction,
$n_y$ is the refractive index of the retardation film surface in the fast axis direction,
$n_z$ is the refractive index of the retardation film in the thickness direction, and
d is the thickness of the retardation film.

7. The retardation film of claim 1, wherein the retardation film has a thickness of 10 μm to 100 μm.

8. The retardation film of claim 1, wherein the composition has a glass transition temperature of 115° C. or more.

9. The retardation film of claim 1, wherein the retardation film has the wavelength dispersion property of 0.1 to 1.0.

10. A polarizing plate comprising:
    a polarizer; and
    the one or more retardation films of claim 1.

11. The polarizing plate of claim 10, wherein a polarizer protection film is attached onto one surface of the polarizer, and
    the retardation film is attached onto a surface opposite to the surface of the polarizer onto which the polarizer protection film is attached.

12. A liquid crystal display device comprising:
    a liquid crystal cell;
    an upper polarizing plate provided on an upper part of the liquid crystal cell;
    a lower polarizing plate provided on a lower part of the liquid crystal cell; and
    a backlight unit provided on a lower part of the lower polarizing plate,
    wherein at least one of the upper polarizing plate and the lower polarizing plate comprises: a polarizer; and the retardation film of claim 1 disposed on one surface of the polarizer.

13. The liquid crystal display device of claim 12, wherein the upper polarizing plate comprises: the polarizer; and the retardation film, and
    the retardation film is disposed so as to face the liquid crystal cell.

14. The liquid crystal display device of claim 12, wherein the lower polarizing plate comprises: the polarizer; and the retardation film, and
    the retardation film is disposed so as to face the backlight unit.

* * * * *